United States Patent
Kesarwani et al.

(10) Patent No.: US 10,733,287 B2
(45) Date of Patent: Aug. 4, 2020

(54) RESILIENCY OF MACHINE LEARNING MODELS

(71) Applicant: International Business Machines Corporation, Armonk, NY (US)

(72) Inventors: Manish Kesarwani, Bangalore (IN); Suranjana Samanta, Bangalore (IN); Deepak Vijaykeerthy, Chennai (IN); Sameep Mehta, New Delhi (IN); Karthik Sankaranarayanan, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 263 days.

(21) Appl. No.: 15/978,868

(22) Filed: May 14, 2018

(65) Prior Publication Data

US 2019/0347410 A1 Nov. 14, 2019

(51) Int. Cl.
| | | |
|---|---|---|
| *G06F 21/55* | (2013.01) | |
| *G06F 21/52* | (2013.01) | |
| *G06K 9/62* | (2006.01) | |
| *G06F 21/57* | (2013.01) | |
| *G06F 21/12* | (2013.01) | |
| *G06N 20/00* | (2019.01) | |
| *G06F 16/903* | (2019.01) | |

(52) U.S. Cl.
CPC .......... *G06F 21/55* (2013.01); *G06F 16/903* (2019.01); *G06F 21/125* (2013.01); *G06F 21/52* (2013.01); *G06F 21/577* (2013.01); *G06K 9/62* (2013.01); *G06N 20/00* (2019.01)

(58) Field of Classification Search
CPC ...... G06F 21/55; G06F 21/125; G06F 21/577; G06F 21/52; G06F 16/903; G06N 20/00; G06K 9/62
See application file for complete search history.

(56) References Cited

U.S. PATENT DOCUMENTS

| | | | |
|---|---|---|---|
| 2015/0193694 A1* | 7/2015 | Vasseur | H04L 41/16 706/12 |
| 2016/0132787 A1 | 5/2016 | Drevo et al. | |
| 2017/0161640 A1 | 6/2017 | Shamir | |

(Continued)

OTHER PUBLICATIONS

Reiter, Et al., "Stealing Machine Learning Models via Prediction API's", Aug. 10-16, 2016, Procedings of the 25th USENIX Security Symposium, p. 601-618. (Year: 2016).*

(Continued)

*Primary Examiner* — Nelson S. Giddins
(74) *Attorney, Agent, or Firm* — Ference & Associates LLC

(57) ABSTRACT

One embodiment provides a method, including: deploying a machine learning model, wherein the deployed machine learning model is used in responding to queries from users; receiving, at the deployed machine learning model, input from a user; identifying a type of machine learning model attack corresponding to the received input; computing, responsive to receiving the input, a resiliency score of the machine learning model, wherein the resiliency score indicates resistance of the machine learning model against the identified type of attack; and performing an action responsive to the computed resiliency score.

20 Claims, 3 Drawing Sheets

(56) References Cited

U.S. PATENT DOCUMENTS

2017/0243132 A1    8/2017  Sainani et al.
2018/0219887 A1*  8/2018  Luo .......................... H04L 63/14
2019/0244103 A1*  8/2019  Wang ..................... G06N 3/082

OTHER PUBLICATIONS

Wang et al., "Stealing Hyperparameters in Machine Learning", May 21-23, 2018, 2018 IEEE Symposium on Security and Privacy, p. 36-52. (Year: 2018).*
Florian Tramer et al., "Stealing Machine Learning Models via Prediction APIs", Proceedings of the 25th USENIX Security Symposium, Aug. 10-12, 2016, Austin, TX, Usa, 19 pages, Usenix.
Nicolas Papernot et al., "Transferability in Machine Learning: from Phenomena to Black-Box Attacks using Adversarial Samples", May 24, 2016, 13 pages, Cornell University Library.

* cited by examiner

RESILIENCY OF MACHINE LEARNING MODELS

BACKGROUND

Machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions regarding to data. Machine learning provides a mechanism that allows a programmer to program a computer for computing tasks where design and implementation of a specific algorithm that performs well is difficult or impossible. To implement machine learning, the computer is initially taught using machine learning models from sample inputs. The computer can then learn from the machine learning model to make decisions when actual data are introduced to the computer.

Some applications utilize machine learning models that are continuously updated based upon received inputs or feedback. For example, a recommendation application may recommend certain products based upon feedback provided by other users. As an example, if users provide feedback indicating that a particular product performs well or performs poorly, the machine learning model can use this input or feedback to assist in making future recommendations. These machine learning models are continuously updated and retrained as new user inputs and feedback are received. This continuous updating allows for the machine learning model to adapt and provide responses that are based upon more current information.

BRIEF SUMMARY

In summary, one aspect of the invention provides a method, comprising: deploying a machine learning model, wherein the deployed machine learning model is used in responding to queries from users; receiving, at the deployed machine learning model, input from a user; identifying a type of machine learning model attack corresponding to the received input; computing, responsive to receiving the input, a resiliency score of the machine learning model, wherein the resiliency score indicates resistance of the machine learning model against the identified type of attack; and performing an action responsive to the computed resiliency score.

A further aspect of the invention provides an apparatus, comprising: at least one processor; and a computer readable storage medium having computer readable program code embodied therewith and executable by the at least one processor, the computer readable program code comprising: computer readable program code configured to deploy a machine learning model, wherein the deployed machine learning model is used in responding to queries from users; receiving, at the deployed machine learning model, input from a user; computer readable program code configured to identify a type of machine learning model attack corresponding to the received input; computer readable program code configured to compute, responsive to receiving the input, a resiliency score of the machine learning model, wherein the resiliency score indicates resistance of the machine learning model against the identified type of attack; and computer readable program code configured to perform an action responsive to the computed resiliency score.

Another aspect of the invention provides a computer program product, comprising: a computer readable storage medium having computer readable program code embodied therewith, the computer readable program code executable by a processor and comprising: computer readable program code configured to deploy a machine learning model, wherein the deployed machine learning model is used in responding to queries from users; receiving, at the deployed machine learning model, input from a user; computer readable program code configured to identify a type of machine learning model attack corresponding to the received input; computer readable program code configured to compute, responsive to receiving the input, a resiliency score of the machine learning model, wherein the resiliency score indicates resistance of the machine learning model against the identified type of attack; and computer readable program code configured to perform an action responsive to the computed resiliency score.

An additional aspect of the invention provides a method, comprising: employing a machine learning model to respond to queries from one or more users; receiving, at the machine learning model, input from one or more users, wherein the received input comprises at least one of: machine learning model training input and a query; calculating a strength score for the machine learning model, wherein the strength score indicates the strength of the machine learning model against an attack from one or more users through received input and wherein the attack is based upon the received input; and providing a notification to a user if the calculated strength score is below a predetermined threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
FIG. 1 illustrates a method of computing the resiliency of a machine learning model.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Many machine learning models are deployed as machine learning as a service models. Machine learning as a service models mean that the machine learning model is deployed and accessible to at least one entity other than the machine learning model owner. The other entity can use or access the machine learning model to perform some task or service for the entity. For example, the entity may need a recommendation machine learning model. Rather than generating the recommendation machine learning model, the entity may simply use a machine learning model that has been deployed as a service. The entity usually pays per usage of the machine learning model. The machine learning model owner also gains a larger visibility for the machine learning model, meaning that if the machine learning model owner is attempting to train the model using feedback from users, the machine learning model is exposed to more users and feedback. From the perspective of the entity using the machine learning model, the entity does not have to purchase and manage expensive hardware or software and does not need to create the machine learning model. However, the machine learning model as a service suffers from the problem that, since the model is exposed to the public, users may attempt to attack the model.

One type of attack that a user may employ is a retraining attack. In such an attack one or more users attempt to retrain or shift the model into providing inaccurate or incorrect responses. Crowdsourcing, or receiving input from a plurality of users regarding a product, application, or service, to train a machine learning model is an effective technique for training a model where the data distribution is not known at the time the model is created. This technique also provides a method that allows the model to adapt to the desired environment or context that the model is being used in. For example, if the model is deployed in a recommendation engine, the model can be adapted to provide recommendations on many different products or services that may be introduced after the model is deployed. However, since the machine learning models can be trained using input received from users, users can provide input that retrains the model to provide responses that are incorrect or inaccurate. Thus, machine learning models, particularly those that are retrained using feedback or input received from users, can be susceptible to retraining attacks where one or more users purposely manipulates the training data so that the machine learning model does not respond correctly.

Another attack that machine learning models may also be susceptible to is a stealing attack. A stealing attack is an attack where one or more users attempt to learn enough about the machine learning model that allows the one or more users to duplicate the machine learning model or the training data associated with the machine learning model. Stealing attacks are applicable to any public machine learning model, for example, the machine learning as a service model. A public machine learning model is a machine learning model that is accessible to (e.g., a user can provide input to either directly or indirectly) a user other than the machine learning model developer or the machine learning model owner. Many machine learning models are public machine learning models which are susceptible to stealing attacks. For example, the machine learning models may be employed in conjunction with an application, where the machine learning model is used to provide information to a user (e.g., a response to a query, predict results, etc.).

No conventional technique exists for determining the resiliency of a machine learning model to one or more attack types. Rather, the conventional techniques have focused on identifying how attacks occur and, therefore, identification of the attacks. Based upon the identification of the types of attacks and how the attacks are carried out, developers of machine learning models have attempted to develop machine learning models that are not as susceptible to the attacks (e.g., by making the machine learning model, the algorithms used to create the machine learning model, and the training data used for training the machine learning model more complex). However, such an approach is not feasible for all types of machine learning models. For example, certain types of machine learning models that may not be as resistant to certain attacks may be the type of machine learning model that needs to be deployed for a particular application. Additionally, a complex machine learning model may be resistant to certain attacks, but may be susceptible to other attacks. In other words, strengthening one feature of a machine learning model may make the machine learning model vulnerable to other types of attacks.

Accordingly, the techniques and systems as described herein provide a system and technique for computing a resiliency score for a machine learning model based upon received input from one or more users. A machine learning model may be deployed, for example, as a machine learning as a service model, to assist in responding to queries provided by users. For example, the machine learning model may be a recommendation model, an image classifier model, a customer service model, or the like. When the model receives input from a user, the system may attempt to classify the input into a type of input, for example, feedback input or query input. Based upon the type of input being received, the system can identify a type of machine learning model attack that corresponds to that input. For example, a retraining attack may correspond to feedback input. As another example, a stealing attack may correspond to query input. The system may then compute a resiliency score for the machine learning model where the resiliency score identifies the resistance of the machine learning model against at least the identified attack. The resiliency score may also identify a resistance of the model against all types of attacks. Based upon the computed resiliency score, the system may perform an action. For example, if the resiliency score is below a predetermined threshold, the system may notify the model owner, take counter measures, fail to respond to the query, or the like.

Such a system provides a technical improvement over current systems for machine learning as a service model deployment. Rather than simply deploying a machine learning model and hoping that the model is not attacked, the described systems and methods can monitor inputs received from one or more users and identify a type of attack that may be attributable to the received input. The system can then compute a resiliency score based upon the received input and perform an action responsive to identifying that the machine learning model may be under attack, for example, by notifying a model owner, performing counter measures, or the like. Additionally, because the system can compute a resiliency score for the machine learning model, when the model owner is ready to deploy the model, the owner can determine if the model should be adjusted to bolster the security of the model. Thus, rather than in conventional systems where the solution to preventing attacks is to create a more complex model, the described systems and methods provide a technique where the system can compute a resiliency score for any model based upon received input. The owner or system can then take action if the resiliency score falls below a predetermined threshold which may indicate the model is under attack.

FIG. 1 illustrates a method for computing a resiliency score for a machine learning model based upon received input from one or more users. At 101 the system may deploy a model for responding to requests, inputs, or feedback received from users, for example, a machine learning as a service model. The model may be deployed in conjunction with an application. For example, an application may include a recommendation engine which uses a machine learning model to provide recommendations. As another example, an application may be an image analysis application that includes an image classification engine that uses a machine learning model to classify or label different images or portions of images. In other words, the application may employ a machine learning model to perform a function of the application. The model may be deployed as a public model meaning that entities other than the model owner can access the model. Thus, the machine learning model may include a public interface. Additionally, the model may include a machine learning model that is trained using input captured from a plurality of users, or, in other words, trained using crowdsourcing techniques.

At 102 the system may receive input from one or more users at the deployed machine learning model. For example, a user may provide a query to an application that employs the machine learning model or to a public interface of the machine learning model. As another example, the user may provide feedback in response to an output of the machine learning model or feedback in response to something within the application utilizing the machine learning model. The feedback may also include input that is not directed to the machine learning model but is rather used by the machine learning model for training. In other words, the feedback may include any type of training data that can be used by the machine learning model to learn. Thus, the received input may be input provided directly to the machine learning model or may include input that is indirectly captured by the machine learning model.

The system may attempt to classify the input type. The classification may include a feedback or training input classification or a query input classification. From the received input the system may identify a type of machine learning model corresponding to the received input at 103. Different input types may be indicative of different types of attacks. For example, to retrain a model a user must provide feedback or training input. The feedback or training input is then used to retrain the model. Therefore, if a user is attempting to perform a retraining attack, the user provides feedback or training input.

On the other hand, to steal a model a user must attempt to learn the parameters associated with the model. Particularly, the user may attempt to learn the decision boundary and/or training data used to train the machine learning model. Thus, the user provides query input to receive responses from the machine learning model. From the responses the user can learn the decision boundary, training data, or other parameters associated with the machine learning model. Therefore, if the user is attempting to perform a stealing attack the user provides query inputs. It should also be understood that not all provided input is malicious input or input that is being used to attack the machine learning model. Rather, under normal operation the machine learning model will be exposed to both feedback or training input and query input. However, it may be difficult for the machine learning model to distinguish whether the input is malicious or genuine input. Therefore, the machine learning model may classify all input that is received and, from the identified received input type, the system may identify an attack type corresponding to the received input.

At 104 the system may compute a resiliency or strength score of the machine learning model. The resiliency or strength score may indicate a resistance of the machine learning model to one or more attack types, or, stated differently, the strength of the machine learning model against an attack. Computation or determination of the resiliency score may be responsive to the received input. In other words, the computation of the resiliency or strength score may be dynamic and occur upon receipt of input. Dynamically computing the resiliency score may allow the resiliency score to be updated based upon repeated inputs by one or more users.

For example, if a user provides a query input, the system may compute a resiliency score. Then if the same user provides another query input, the system may compute a new resiliency score, which may be lower than the first resiliency score. This may occur because to steal a machine learning model the user would have to provide multiple query inputs to learn the parameters of the machine learning model. Therefore, as a user provides more and more queries, the system may detect that the user is attempting a stealing attack and as more queries are provided the user is learning more information regarding the model. Thus, the resiliency score against this attack type will continue to decrease as the user provides more query inputs. Similarly, in the case that a user is attempting to retrain the machine learning model, the user would have to provide multiple inputs. Therefore, as the user provides more and more inputs, the resiliency score against this attack type may decrease.

Different factors may influence the resiliency of the model. Additionally, different factors may cause the model to be more resilient against one attack and less resilient against a different attack. Some factors that may influence the resiliency score include the complexity of the model, complexity of the training data used to train the model, whether the model is a dynamic or static model with respect to feedback, whether the model is a single large model or multiple cooperating smaller models, whether the model is non-deterministic or randomized, whether the system performs post-processing on the output of the model, whether there is a manual step in the process, or the like. These factors are merely example factors and are intended to be non-limiting and other factors may contribute to the resiliency of the model, for example, factors arising from data accessible to the model, factors arising from the model itself, factors arising from run-time behavior, and the like.

For an example comparison of resiliency, a logistic regression model and a neural network model will be compared. A logistic regression model is a linear model, meaning the decision boundaries created over the training data are linear in nature. This means that the linear model is susceptible to stealing attacks because to learn the model parameters the attacker must simply solve linear equations. However, if the linear model is a static model, meaning it does not retrain itself using feedback from users, the linear model is strong against retraining attacks. On the other hand, neural network models do not have a linear decision boundary. Thus, learning the model parameters is more difficult, making the neural network model less susceptible to stealing attacks. However, neural network models are frequently used in dynamic models where the model retrains itself using feedback from users. Therefore, this dynamic model may be susceptible to retraining attacks.

A resiliency score corresponding to the resistance of the model against retraining attacks is a measure of the amount of training or the number of training samples that are needed to alter the existing decision boundary of the machine learning model. To compute the resiliency score corresponding to the retraining attack resistance, the system may use different components. One component may include the stability of the model. The stability of the model is determined by the change incurred in learning the model parameters with a slight perturbation in the training data. In other words, the stability of the model is determined based upon how much influence a single feedback or input has on the decision boundary of the model. Unstable models are more susceptible to retraining attacks because minor changes in the training data can cause large changes in the model. Therefore, a more stable model requires more effort to retrain, thereby resulting in a higher resiliency score with respect to the stability component. Computation of the stability may be performed using a variety of techniques. As a non-limiting example, one technique includes the leave-one-out-cross-validation technique which measures the difference in loss function in each of the folds of cross validation.

Another component is the regularization component. Regularization smooths the effects of outliers. Therefore, the regularization directly influences the generalization of a model. A more generalized model is less susceptible to minor changes in the training data, thereby making the model more robust since a significant effort or change in the training data is required for successful retraining of the model. Accordingly, this component of the resiliency score will be higher for a more regularized or generalized model. Additionally, the nature of the regularizer affects the resiliency of the model towards adversaries. A non-limiting technique for computing the regularization is a norm loss function for linear functions. The system then adds a positive number to the score which characterizes the robustness of the regularizer against adversarial changes.

Another component of the resiliency score with respect to a retraining attack is the number of training parameters. As the number of training parameters required to train the model increases, the number of inputs to retrain the model also increases. The number of training samples required for a successful training is directly proportional to the number of parameters of the model to be optimized. Therefore, a model having a higher number of training parameters is more robust or resilient against a retraining attack since it will require a larger effort to provide enough inputs to retrain the model. A non-limiting technique for identifying the number of parameters is determining the dimension of the dataset. In a linear model the number of samples needed to train the model is the dimension of the dataset plus one. Thus, the more parameters within the model, the more samples that will be needed to retrain the model.

Another component of the retraining attack resiliency score is the training data distribution. To retrain a model, the data distribution of the retraining set needs to be significantly different than that of the original training data in order to alter the model parameters successfully. Therefore, if the original training data is a simple data distribution, finding training data that is significantly different will be very easy. Thus, a model having a simple data distribution will be more susceptible to a retraining attack than a model having a more complex or diverse data distribution. A non-limiting technique for measuring the training data distribution component is a divergence function, for example, a Kullback-Leibler (KL) Divergence measure, which estimates the divergence between two data distributions, that is, it estimates the similarity/dissimilarity between the retraining data and the original training data. To compute the retraining attack resiliency score the system may add the different component scores. Alternatively, the system may keep the components separate to identify which component or model factor is contributing to a low score.

A stealing attack resiliency score is a measure of how easy it is to learn the model parameters. In a stealing attack, one or more users provide a plurality of queries. As each query is responded to by the machine learning model, the user can learn something about the machine learning model. The user can then estimate model parameters using the model output. Thus, with enough queries the user(s) can learn all the model parameters and effectively steal the model. The stealing attack resiliency score may have multiple components. One component may include the number of model parameters. The higher the number of parameters, the more queries that will be required to learn the parameters, thereby making the model more resistant to stealing attacks. This component is similar to the number of training parameters as discussed in connection with the retraining attack resiliency score component.

Another component of the stealing attack resiliency score is the number of query samples. In connection with this component is the type or pattern of the query sample component. These components may be individual components or may be a single component having two factors. One way to steal the model is to generate queries from the entire population that was used to train the model. However, a more intelligent method is to identify the boundary conditions of the model and generate queries that are close to the boundary. Thus, if the user is allowed to provide an infinite number of queries, the user will eventually learn the model parameters and steal the model. Thus, the resiliency score may decrease as the same user continues to provide queries. Additionally, the user will attempt to intelligently synthesize the queries. Therefore, the queries may take on a pattern to minimize the number of queries needed to steal the model. A non-limiting technique for computing the query pattern component is by determining the distance of the query from the decision boundary. Again, as a user provides more queries, particularly queries having a pattern, the resiliency score may decrease. To compute the stealing attack resiliency score the system may add the different component scores. Alternatively, the system may keep the components separate to identify which component or model factor is contributing to a low score.

The system may simply compute one of: the retraining attack resiliency score and the stealing attack resiliency score. Alternatively, the system may compute both scores. In the case that both scores are computed, the system may generate an overall resiliency score, for example, by adding or averaging the two scores. The system may then compare either the individual resiliency scores or the overall resiliency score to a predetermined threshold at 105. The predetermined threshold may be a default threshold or a threshold set by a user. The predetermined threshold may also be a score drop threshold. For example, the threshold may be equal to an amount that a single user or a group of users can cause the resiliency score to drop by. If the score has a starting number and, upon receipt of additional inputs by one or more users, the score drops by the predetermined threshold value, the system may determine that the resiliency score is below the predetermined threshold. If the system determines that the resiliency score is not below a predetermined threshold at 105, the system may process the input normally at 107.

If, however, the system determines that the resiliency score has dropped or is below a predetermined threshold, the system may perform an action at 106. Performing an action may include notifying the model owner that the resiliency score is below the predetermined threshold. The notification may also identify which factors or components of the model are contributing to the low score. The notification may also identify the user(s) who are providing the input resulting in the low score. The model owner may then take steps to ensure that the model cannot be attacked. For example, in the case of a retraining attack the model owner may reset the model to a clean model. As another example, in the case of a stealing attack the model owner may disable the model.

Performing an action may also include the system taking counter measures to thwart the attack. For example, the system may stop responding (e.g., stop providing responses to queries, stop incorporating input into training data, etc.) to input received by a particular user who has been identified as a possible adversary. As another example, the system may reset the model to a clean model state. As another example, the system may increase the monetary charge to the user identified as a possible adversary for using the model. The resiliency scores may also be used before deployment of the machine learning model. For example, a model owner may have the choice between two different models having accuracy differences. However, the model owner may want to deploy a model having a higher resistance to attacks. Therefore, the model owner may use the system described to calculate the resiliency scores of the two models and then choose the model having the higher resiliency score, even if that model is less accurate than the other model.

Figure 2:
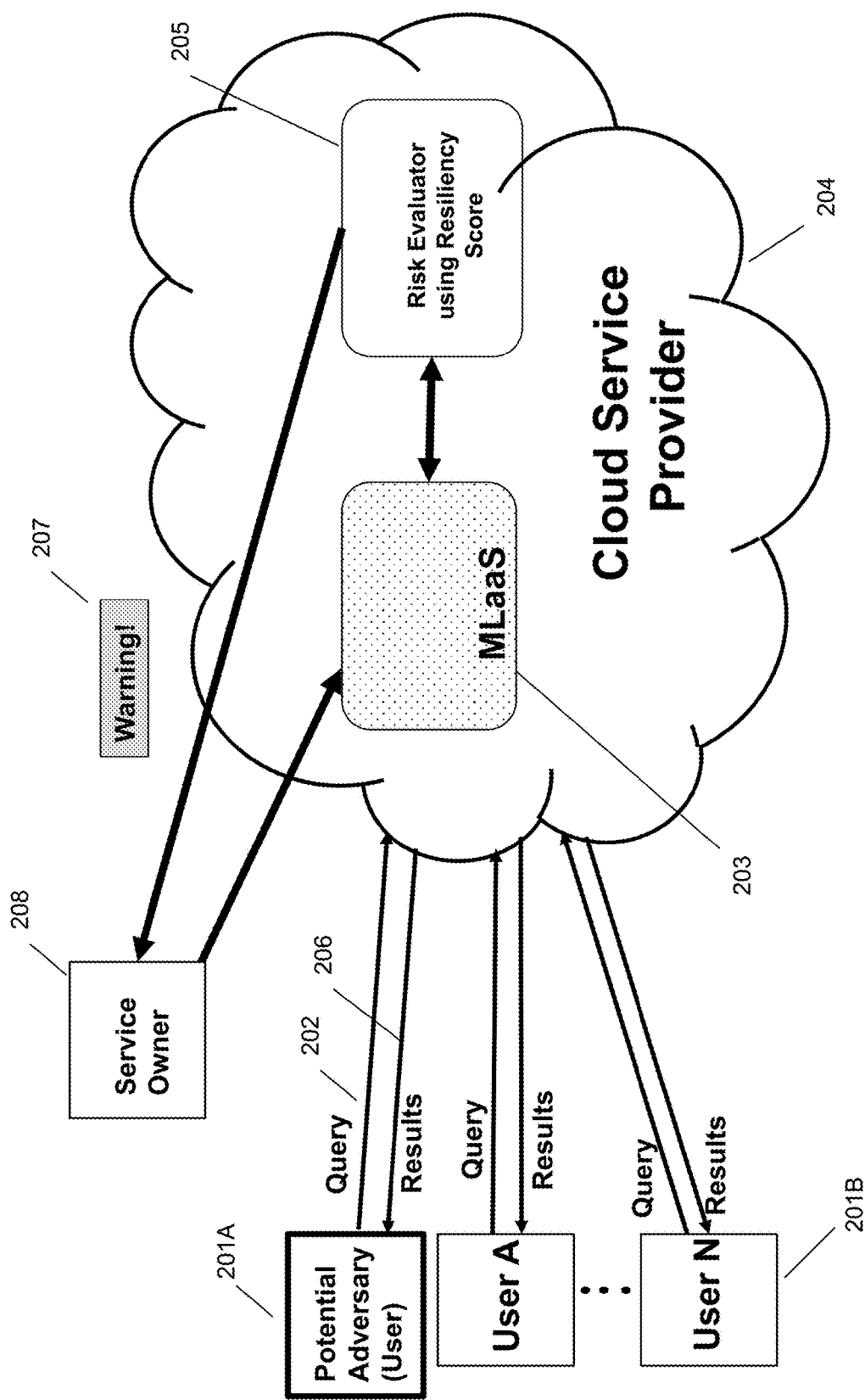
FIG. 2 illustrates an example system for computing the resiliency of a machine learning model.

FIG. 2 illustrates an overall example system illustrating the different components that may be found in the described systems and methods. Users 201A and 201B may provide queries or inputs 202 to the machine learning as a service model 203 belonging to a service owner 208 and that is managed by a cloud service provider 204. As queries or inputs 202 are provided from users, the risk evaluator 205 may compute the resiliency score of the machine learning model 203. Using this score the system may identify that one of the users 201A and 202B may be a potential adversary 201A. If none of the users 201A and 201B are identified as potential adversaries, the machine learning model system 203 may provide results 206 of the queries to the users 201A and 201B. If, however, the resiliency score drops below a predetermined threshold or a user is identified as a potential adversary, the system may perform an action with respect to the received input, for example, providing a warning or notification 207 to the service owner 208. The service owner 208 may then take action with respect to the model or adversary.

Thus, the described systems and methods provide a technique for computing a resiliency score for a machine learning model in response to receiving user input. The resiliency score can be computed dynamically, thereby providing an indication if an attack is currently being deployed. The system can then automatically perform counter measures to counter the attack or notify a user of the attack. Accordingly, the described systems and methods provide a technical improvement to current systems in machine learning model deployment by providing a system that can identify a respond to attacks, which is not provided in any conventional techniques or systems.

Figure 3:
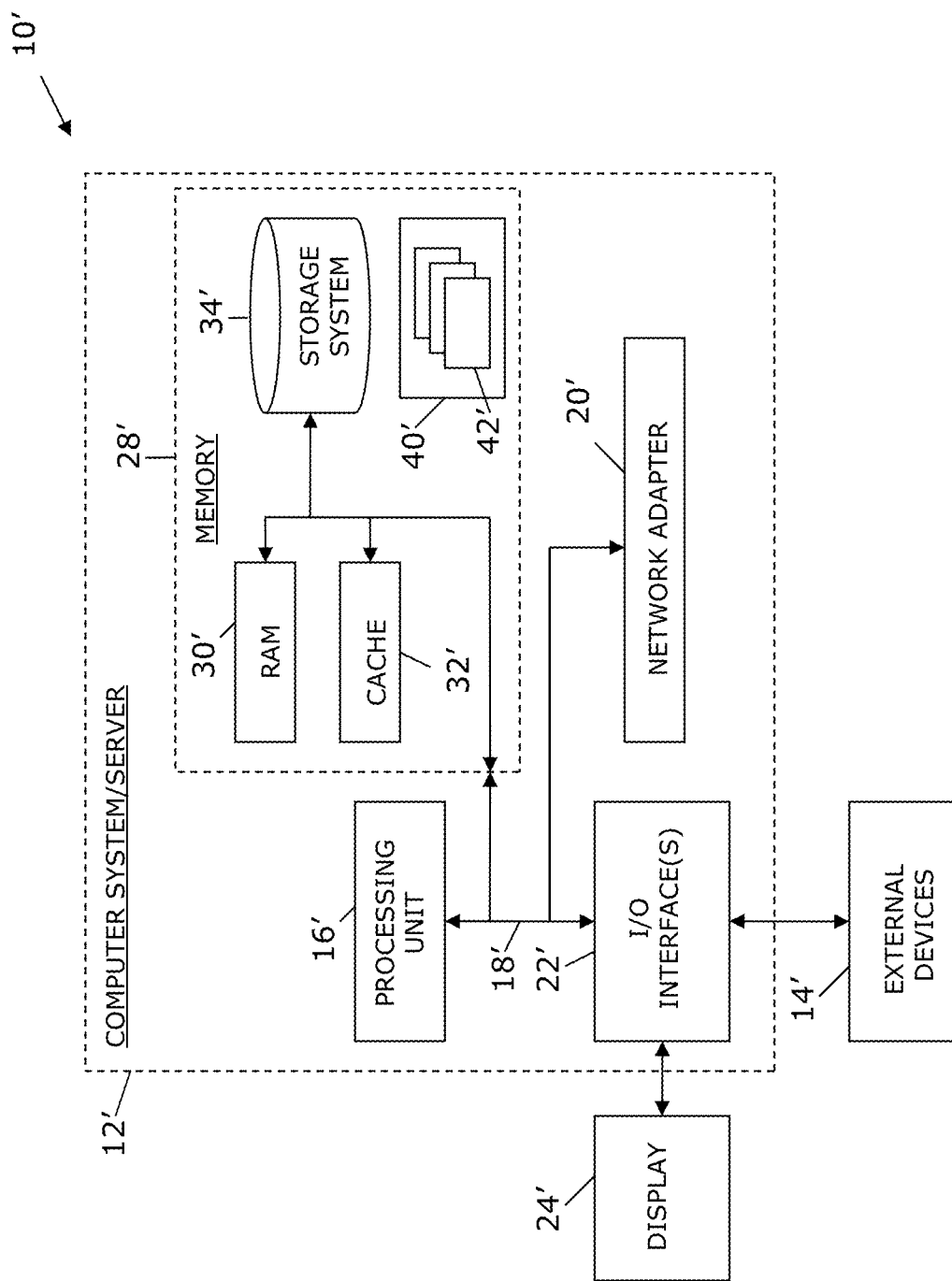
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/ server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   deploying a machine learning model, wherein the deployed machine learning model is used in responding to queries from users;
   receiving, at the deployed machine learning model, input from a user;
   identifying a type of machine learning model attack corresponding to the received input;
   computing, responsive to receiving the input, a resiliency score of the machine learning model, wherein the resiliency score indicates resistance of the machine learning model against the identified type of attack; and
   performing an action responsive to the computed resiliency score.

2. The method of claim 1, wherein the received input comprises feedback, and wherein the identified type of machine learning model attack comprises a retraining attack.

3. The method of claim 2, wherein the resiliency score corresponding to the retraining attack is based upon at least one of: (i) the stability of the machine learning model, (ii) the regularization of the machine learning model, (iii) the number of training parameters of the machine learning model, and (iv) the training data distribution of the machine learning model.

4. The method of claim 1, wherein the received input comprises a user query, and wherein the identified type of machine learning model attack comprises a stealing attack.

5. The method of claim 4, wherein the resiliency score corresponding to the stealing attack is based upon at least one of: (i) the number of parameters of the model, (ii) the number of query samples needed to learn the machine learning model, and (iii) the type of queries needed to learn the machine learning model.

6. The method of claim 1, wherein the resiliency score comprises (i) a component identifying the resistance of the machine learning model against retraining attacks and (ii) a component identifying the resistance of the machine learning model against stealing attacks.

7. The method of claim 1, wherein the computing a resiliency score comprises computing an overall resiliency score indicating resistance of the machine learning model against all attack types.

8. The method of claim 1, comprising identifying a component of the machine learning model contributing to a machine learning model having a computed resiliency score below a predetermined threshold.

9. The method of claim 1, wherein the performing an action comprises notifying a user if the computed resiliency score is below a predetermined threshold.

10. The method of claim 1, wherein the performing an action comprises performing counter measures in response to the received input.

11. An apparatus, comprising:
    at least one processor; and
    a computer readable storage medium having computer readable program code embodied therewith and executable by the at least one processor, the computer readable program code comprising:
    computer readable program code configured to deploy a machine learning model, wherein the deployed machine learning model is used in responding to queries from users;
    computer readable program code configured to receive, at the deployed machine learning model, input from a user;
    computer readable program code configured to identify a type of machine learning model attack corresponding to the received input;
    computer readable program code configured to compute, responsive to receiving the input, a resiliency score of the machine learning model, wherein the resiliency score indicates resistance of the machine learning model against the identified type of attack; and computer readable program code configured to perform an action responsive to the computed resiliency score.

12. A computer program product, comprising:
a computer readable storage medium having computer readable program code embodied therewith, the computer readable program code executable by a processor and comprising:
computer readable program code configured to deploy a machine learning model, wherein the deployed machine learning model is used in responding to queries from users;
computer readable program code configured to receive, at the deployed machine learning model, input from a user;
computer readable program code configured to identify a type of machine learning model attack corresponding to the received input;
computer readable program code configured to compute, responsive to receiving the input, a resiliency score of the machine learning model, wherein the resiliency score indicates resistance of the machine learning model against the identified type of attack; and
computer readable program code configured to perform an action responsive to the computed resiliency score.

13. The computer program product of claim 12, wherein the received input comprises feedback; and
wherein the identified type of machine learning model attack comprises a retraining attack; and
wherein the resiliency score corresponding to the retraining attack is based upon at least one of: (i) the stability of the machine learning model, (ii) the regularization of the machine learning model, (iii) the number of training parameters of the machine learning model, and (iv) the training data distribution of the machine learning model.

14. The computer program product of claim 12, wherein the received input comprises a user query; and
wherein the identified type of machine learning model attack comprises a stealing attack; and
wherein the resiliency score corresponding to the stealing attack is based upon at least one of: (i) the number of parameters of the model, (ii) the number of query samples needed to learn the machine learning model, and (iii) the type of queries needed to learn the machine learning model.

15. The computer program product of claim 12, wherein the resiliency score comprises (i) a component identifying the resistance of the machine learning model against retraining attacks and (ii) a component identifying the resistance of the machine learning model against stealing attacks.

16. The computer program product of claim 12, wherein the computing a resiliency score comprises computing an overall resiliency score indicating resistance of the machine learning model against all attack types.

17. The computer program product of claim 12, comprising identifying a component of the machine learning model contributing to a machine learning model having a computed resiliency score below a predetermined threshold.

18. The computer program product of claim 12, wherein the performing an action comprises notifying a user if the computed resiliency score is below a predetermined threshold.

19. The computer program product of claim 12, wherein the performing an action comprises performing counter measures in response to the received input.

20. A method, comprising:
employing a machine learning model to respond to queries from one or more users;
receiving, at the machine learning model, input from one or more users, wherein the received input comprises at least one of: machine learning model training input and a query;
calculating a strength score for the machine learning model, wherein the strength score indicates the strength of the machine learning model against an attack from one or more users through received input and wherein the attack is based upon the received input; and
providing a notification to a user if the calculated strength score is below a predetermined threshold.

* * * * *